May 20, 1930.  D. BENJAMIN  1,759,430
BALL AND SOCKET CONNECTION
Filed July 14, 1928
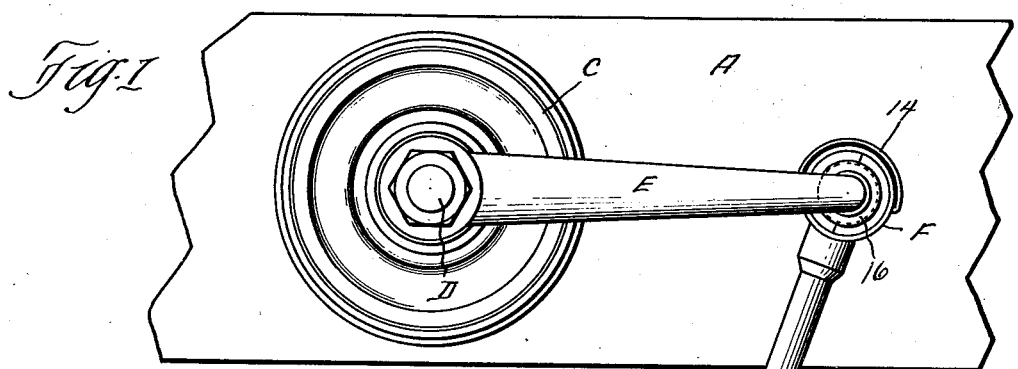
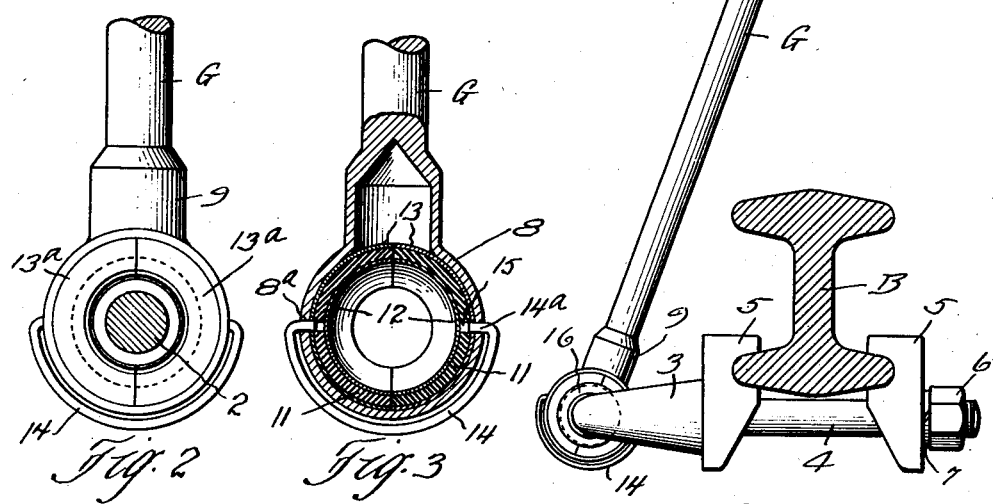
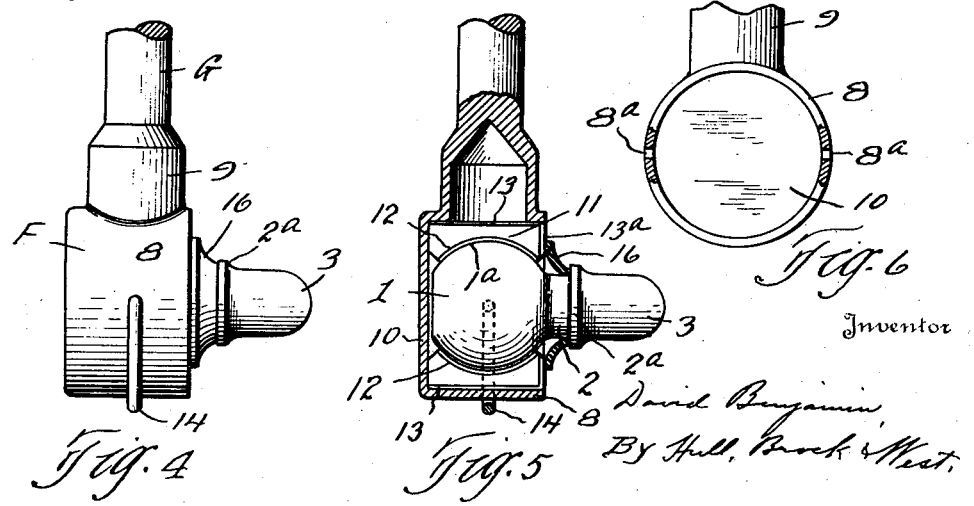

Patented May 20, 1930

1,759,430

UNITED STATES PATENT OFFICE

DAVID BENJAMIN, OF CLEVELAND HEIGHTS, OHIO, ASSIGNOR TO THE GABRIEL COMPANY, OF CLEVELAND, OHIO, A CORPORATION OF OHIO

BALL AND SOCKET CONNECTION

Application filed July 14, 1928. Serial No. 292,613.

This invention relates to ball-and-socket connections and, while the connection described herein is particularly adapted for use as a means for operating shock absorbers for vehicles, it is capable of other uses and of wider applications than the one specifically mentioned.

It is the general purpose and object of the invention to provide an efficient connection of the type referred to, and more particularly to provide a socket mounting which may be readily assembled and disassembled; also to provide a connection of the character referred to which will effectually prevent the entrance of dust between the working parts thereof. Further and more limited objects and advantages of the invention will appear hereinafter in the detailed description.

In the drawings, Fig. 1 represents a sectional side elevation of the side frame and axle of an automobile having a shock absorber applied thereto and including a connecting rod provided with my invention; Fig. 2 an elevation of the lower end of the connecting rod, showing the ball-supporting stud in section; Fig. 3 a detail in section through the socket shown in Fig. 2; Fig. 4 a side elevation of the lower end of the connecting rod, of the housing, and of the arm having the ball within the housing; Fig. 5 a detail in section through the socket housing shown in Fig. 1, the view being taken at right angles to Fig. 3, and the ball, stud and arm being shown in elevation; and Fig. 6 a front elevation of the housing shown in Figs. 2 to 5, the sides being broken away.

Describing the parts by reference characters, A denotes the side frame member and B the axle of an automobile. Secured to the side frame member A is the casing C of a liquid-containing shock absorber. Projecting from the casing is the shaft D which operates the vane or piston (not shown), while E denotes an arm secured to the shaft and having at its outer end a stud carrying a ball 1 mounted in the socket housing, indicated generally at F. The socket housing is carried by a connecting rod G having at its lower end another housing F, preferably identical with the housing at the upper end thereof, the housing F receiving a ball 1 on a stud 2 projecting from an arm 3 constituting an extended head of a bolt 4, by means of which bolt and a pair of clamps 5, through which the bolt extends, the said arm and ball are supported from the axle. The bolt is provided with a nut 6 and washer 7.

As stated hereinbefore, the socket mountings are identical; and a detail description of one of these mountings will suffice for both, the one shown in detail herein being the one at the lower end of the rod G. Each socket mounting comprises the housing F referred to hereinbefore. The housing consists generally of a cylindrical side wall 8 which carries at its top a sleeve projection 9 which may be secured in any desired manner, as by butt-welding, to the bottom of the rod G. The housing has a back wall 10 and an open front. Mounted within the housing are the socket bearing members each consisting of an outer body or backing 11, made preferably of soft rubber and having vulcanized thereto an inner lining 12 of anti-friction metal, such as graphite bronze. The graphite bronze lining of each of these members is formed as a segment of a sphere approximating a hemisphere. The two bearing members 12 form, when assembled, a continuous hemispherical bearing for the cooperating spherical surface 1ª of the ball 1, but being open front and back, as shown, with the stud 2 projecting through the front opening. The outer surface of the backing 11 is a half cylinder, and each of the backings 11 is in turn enclosed in a metal casing 13, the said casings being semi-cylindrical and each having a semi-annular front flange 13ª.

In assembling, the two bearing members are applied to the ball 1 and the assembly is slipped into the front of the housing. The bearing members are then locked in place by means of a lock consisting of a spring wire 14 bent to semi-circular form and having inturned ends 14ª presented toward each other, which ends are adapted to snap into openings 8ª provided therefor in the housing F and into openings 15 for such inturned ends provided in the casings 13 and backings 11. The openings 8ª are located about half way between the front and the back of the housing F and preferably in the line of a horizontal diameter through said casing. It will be noted that, with this arrangement, the bearing members are preferably inserted so that their engaging faces will be in a vertical plane—at right angles to the line joining the openings 8ª.

For the purpose of preventing the access of dust to the bearing members, a rubber washer 16 is applied to the stud 2, with its inner edge in engagement with the rear face of the flange 2ª and with its outer edge in engagement with the flanges 13ª of the bearing members.

For convenience of description, the substantially open side of the housing F has been referred to and will be referred to hereinafter as the "front" side or face and the opposite side will be referred to as the "rear" side or face. Furthermore, for convenience of description, the housing will be assumed as used in the positions indicated in Figs. 2-5 inclusive, and the terms "top" and "bottom" have been employed, and will be employed hereinafter, in identifying the positions of the parts of and within the housing. However, by the use of these terms I do not propose to limit the use of my invention to any particular position of the housing, with a corresponding limitation as to the positions of the parts therewithin.

Having thus described my invention, what I claim is:

1. A socket mounting comprising a substantially cylindrical housing having an open front, a pair of symmetrical bearing members each consisting of an inner hemispherical anti-friction lining, an outer semi-cylindrical backing of resilient deformable material, and a metallic semi-cylindrical housing for said backing, each bearing-member housing having an inwardly projecting semi-annular flange at the front edge thereof, and means for locking the said bearing members in place in the first housing.

2. A socket mounting comprising a housing having an open front, a pair of symmetrical bearing members each consisting of an inner hemispherical anti-friction lining, an outer backing of resilient deformable material, and a metallic housing for said backing, and means for locking the said bearing members in place in the first housing.

3. A socket mounting comprising a substantially cylindrical housing having an open front, a pair of symmetrical bearing members each consisting of an inner hemispherical anti-friction lining, an outer semi-cylindrical backing of resilient deformable material and a metallic semi-cylindrical housing for said backing, each bearing member housing having an inwardly projecting semi-annular flange at the front edge thereof, and means for locking the said bearing members in place in the first housing, the said means comprising opposed openings in the wall of the cylindrical housing, and a spring loop having ends adapted to be snapped into and being disposed in the said openings and to engage the bearing members.

4. A socket mounting comprising a cylindrical housing having an open front, a pair of symmetrical bearing members each consisting of an inner hemispherical anti-friction lining, an outer backing of resilient deformable material and a metallic housing for said backing, the bearing-members providing, when assembled, a front opening for a ball-supporting stud, and means for locking the said bearing members in place in the first housing.

5. A socket mounting comprising a substantially cylindrical housing having an open front, a pair of symmetrical bearing members each consisting of an inner hemispherical anti-friction lining, an outer semi-cylindrical backing of resilient deformable material and a metallic semi-cylindrical housing for said backing, each bearing-member housing having an inwardly projecting semi-annular flange at the front edge thereof, and means for locking the said bearing members in place in the first housing, the said means comprising opposed openings in the wall of the cylindrical housing, each of the bearing member housings having an opening therethrough, and a spring wire loop having inturned ends adapted to be sprung through and being disposed in the openings in the outer housing and the openings in the bearing-member housings.

6. A socket mounting comprising a substantially cylindrical housing having an open front, a pair of symmetrical bearing members each having an inner hemispherical bearing surface and an outer semi-cylindrical surface, and means for locking the said bearing members in place, the said means comprising opposed openings the wall of the cylindrical housing, the outer semi-cylindrical surface of each of the bearing members having an opening, and a spring wire loop having inturned ends adapted to be sprung through and being disposed in the openings in the housing and in the openings in the outer surfaces of the bearing members.

In testimony whereof, I hereunto affix my signature.

DAVID BENJAMIN.